(12) United States Patent  (10) Patent No.: US 7,796,709 B2
Mak et al.  (45) Date of Patent: *Sep. 14, 2010

(54) METHOD AND SYSTEM FOR SIGNAL QUALITY MEASUREMENT BASED ON MEAN PHASE ERROR MAGNITUDE OF A SIGNAL

(75) Inventors: Siukai Mak, Poway, CA (US); Brima Ibrahim, Aliso Viejo, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/364,465

(22) Filed: Feb. 2, 2009

(65) Prior Publication Data

US 2009/0227210 A1 Sep. 10, 2009

Related U.S. Application Data

(63) Continuation of application No. 11/135,854, filed on May 24, 2005, now Pat. No. 7,486,748.

(60) Provisional application No. 60/634,727, filed on Dec. 8, 2004.

(51) Int. Cl.
*H04L 27/16* (2006.01)

(52) U.S. Cl. .................. 375/325; 375/371; 455/67.13; 455/226.3

(58) Field of Classification Search .................. 375/324, 375/325, 340, 344, 346, 354, 371, 377, 285; 455/67.11, 67.13, 67.16, 182.2, 192.2, 226.1, 455/226.2, 226.3; 329/318, 320, 349, 353
See application file for complete search history.

(56) References Cited

U.S. PATENT DOCUMENTS 7,203,252 B2 * 4/2007 Lashkarian ................. 375/324
7,453,861 B2 * 11/2008 Leung et al. ................ 370/342

OTHER PUBLICATIONS

Steven Hall, Radio Frequency Change Request for Medium Rate IP, Bluetooth Specification v 1.2, 2003.
Steven Hall, Baseband Change Request for Medium Rate IP, Bluetooth Specification v 1.2, 2003.

* cited by examiner

*Primary Examiner*—Dac V Ha
(74) *Attorney, Agent, or Firm*—McAndrews, Held & Malloy

(57) ABSTRACT

Various aspects of a method and system from signal quality measurement based on mean phase error magnitude of a signal are presented. Aspects of the system may comprise circuitry that receives a time phase corrected Bluetooth signal via an RF channel. The circuitry may generate a phase error signal based on the received time phase corrected Bluetooth signal, and generate a mean phase error signal based on the generated phase error signal. A signal to noise ratio (SNR) may be derived based on the generated mean phase error signal, and a data rate may be selected based on the derived SNR.

36 Claims, 8 Drawing Sheets

METHOD AND SYSTEM FOR SIGNAL QUALITY MEASUREMENT BASED ON MEAN PHASE ERROR MAGNITUDE OF A SIGNAL

CROSS-REFERENCE TO RELATED APPLICATIONS/INCORPORATION BY REFERENCE

This application is a continuation of U.S. application Ser. No. 11/135,854 filed May 24, 2005.

This application makes reference to, claims priority to, and claims the benefit of U.S. Provisional Application Ser. No. 60/634,727 filed Dec. 8, 2004.

The above stated application is hereby incorporated herein by reference in its entirety.

FIELD OF THE INVENTION

Certain embodiments of the invention relate to measure of an RF signal. More specifically, certain embodiments of the invention relate to a method and system for signal quality measurement based on a mean phase error magnitude of a signal.

BACKGROUND OF THE INVENTION

Communication systems are known to support wireless and wired communications between wireless and/or wired communication devices. Such communication systems range from national and/or international cellular telephone systems to the Internet to point-to-point in-home wireless networks. Each type of communication system is designed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, and/or home entertainment equipment, communicates directly or indirectly with other wireless communication devices. For direct communications, also known as point-to-point communications, participating wireless communication devices may tune their receivers and transmitters to the same channel, or channels, such as one or more of the plurality of radio frequency (RF) carriers of the wireless communication system, and communicate over one or more of those channels. For indirect wireless communications, each wireless communication device communicates directly with an associated base station for use of cellular services, for example, and/or an associated access point for use of an in-home or in-building wireless network, for example, via an assigned channel, or channels. To complete a communication connection between the wireless communication devices, the associated base stations and/or associated access points communicate with each other directly, via a system controller, via the public switch telephone network, via the internet, and/or via some other wide area network.

For each wireless communication device to participate in a wireless communications session, it may include a built-in radio transceiver comprising a receiver and transmitter, or it may be coupled to an associated radio transceiver, such as a station for in-home and/or in-building wireless communication networks, and/or an RF modem. The transmitter may be adapted to convert data into RF signals by modulating the data in accordance with the particular wireless communication standard to produce baseband signals and mixes the baseband signal with a local oscillator signal in one or more intermediate frequency stages to produce the RF signals. The radio receiver may comprise an antenna section, a filtering section, a low noise amplifier, an intermediate frequency (IF) stage, an equalization stage, and/or a demodulator. The antenna section may receive RF signals and may provide them to the filtering section, which, in turn, may pass RF signals of interest to the low noise amplifier (LNA).

The LNA may amplify the received RF signals of interest and may provide them as amplified RF signals to the IF stage. The IF stage may step down the frequency of the RF signals of interest to an intermediate frequency or to baseband. The IF stage may then provide the intermediate frequency signals, or baseband signals, to the equalization stage. The equalization stage may add loss or delay to specific frequencies to produce a flat frequency response. The equalization stage may then output an in-phase (I) and/or a quadrature (Q) component to the demodulator. The demodulator may be adapted to synchronize the signal and/or to recapture the data in accordance with a demodulation protocol. During operation, the signal quality of a received signal may be utilized to determine how best to receive and demodulate the signal.

In some conventional systems, signal quality of an RF signal is usually estimated by using received signal strength indicator (RSSI) measurement and packet error rate (PER). However, due to interference environment, the received signal strength indicator measurement and packet error rate measurement may not provide an accurate estimation of the signal quality. During reception, due to interference, it may be difficult to determine whether a received signal is an intended received signal or interference. For example, a strong signal may be received with good signal quality, but this signal may be interference rather then the intended received signal. Furthermore, to get an accurate estimate of the packet error rate, a large enough population of packets is required and this may take a substantial amount of time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for signal quality measurement based on a mean phase error magnitude of a signal, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for signal quality measurement based on a mean phase error magnitude of a signal. Various aspects of the invention estimate signal quality by determining a mean phase error magnitude of a received signal at an optimal sampling instant. For an M-ary PSK signal, the phase of a transmitted signal at the optimal point may be one of M possible phases. For coherent demodulation, the phase of the PSK signal is first corrected and the phase that is received may be determined by comparing the phase error between the received signal and the M possible phases at the optimal sampling instant. The mean of the phase error magnitude may be dependent on the channel noise and interference in the received signal. Therefore, the mean phase error magnitude at the optimal instant may be utilized to estimate the signal quality. Aspects of a method for processing a received RF signal may comprise generating a timing error signal based on a received Bluetooth signal, comparing the generated timing error signal with a numerical threshold value, and generating a time correction signal based on the comparison.

Figure 1A:
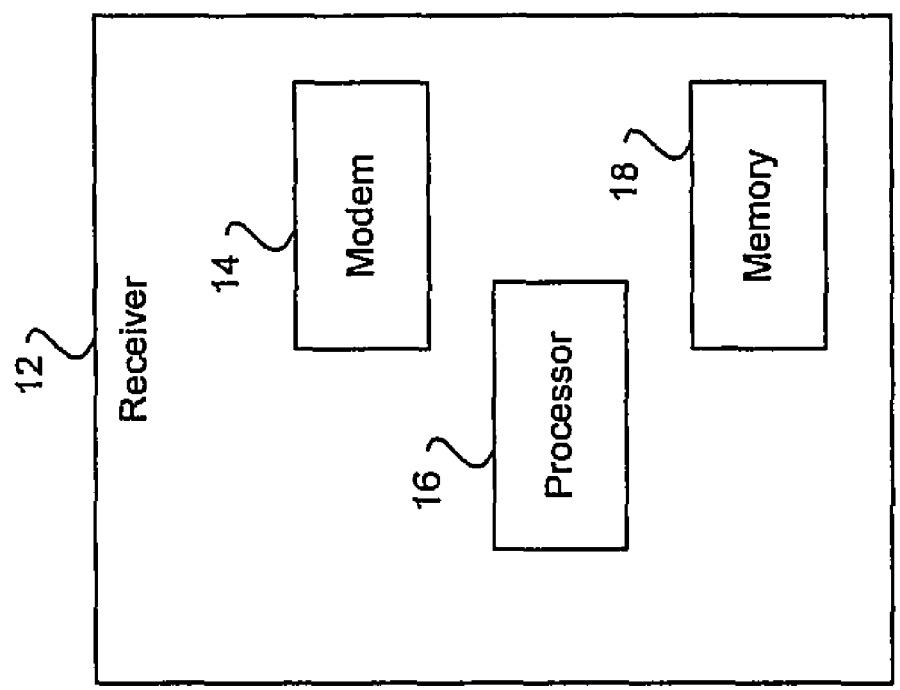
FIG. 1a is a block diagram of an exemplary system for signal quality measurement based on a mean phase error magnitude of a signal in accordance with an embodiment of the invention.

FIG. 1a is a block diagram of an exemplary system for signal quality measurement based on a mean phase error magnitude of a signal in accordance with an embodiment of the invention. Referring to FIG. 1a, there is shown a receiver 12 comprising a modem block 14, a processor block 16 and a memory block 18.

The receiver 12 may comprise suitable circuitry, logic and/or code that may be adapted to receive and process a received signal. The modem block 14 may comprise suitable circuitry, logic and/or code that may be adapted to modulate and demodulate a received signal. A received RF signal may be demodulated by the modem block 14 to generate an IF signal.

The processor block 16 may comprise suitable circuitry, logic and/or code that may be adapted to handle processing of signals that are received by the receiver block 12. The processor block 16 may also be adapted to handle various functions and operations performed during modulation and demodulation by the modem block 14.

The memory block 18 may comprise suitable logic and/or circuitry that may be adapted to store information handled by the processor block 16 and/or the modem block 14, which may be associated with the receiver 12. The memory block 18 may comprise read only memory (ROM) and/or random access memory (RAM). For example, the memory block 18 may be adapted to store direct digital frequency synthesizer (DDFS) information in at least a ROM portion of the memory block 18.

Figure 1B:
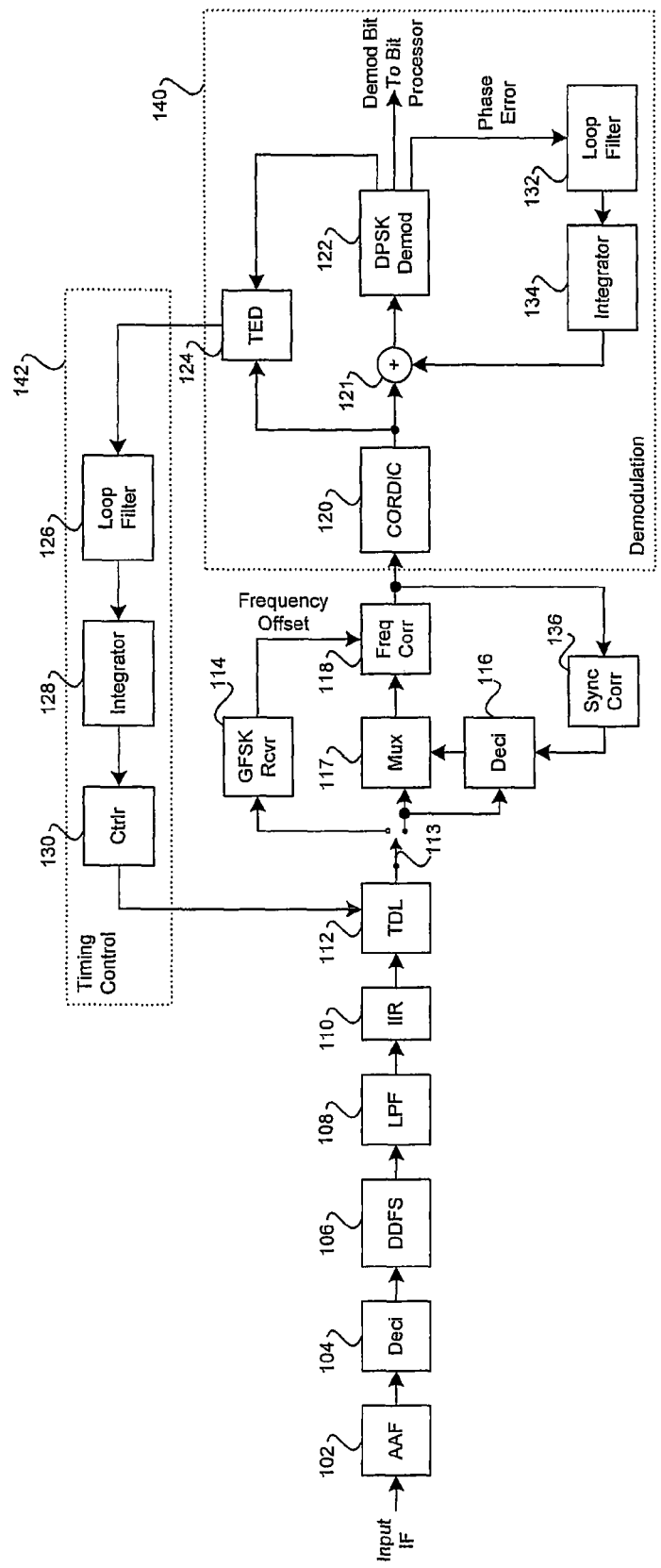
FIG. 1b is an exemplary block diagram of the modem of FIG. 1a, in which signal quality measurement based on a mean phase error magnitude of a signal may be utilized, in accordance with an embodiment of the invention.

FIG. 1b is an exemplary block diagram of the modem of FIG. 1a, in which signal quality measurement based on mean phase error magnitude of a signal may be utilized, in accordance with an embodiment of the invention. Referring to FIG. 1b, there is shown an anti-aliasing filter block (AAF) 102, a decimator block 104, a direct digital frequency synthesizer (DDFS) 106, a low pass filter block 108 (LPF), infinite impulse response filter block (IIR) 110, time delay line (TDL) block 112, a timing control block 142, and a demodulation block 140. FIG. 1b further comprises a selector 113, Gaussian frequency shift keying (GFSK) receiver block 114, multiplexer (MUX) block 117, decimator block 116, frequency correction block 118, and a synchronization correlator block 136. The demodulation block 140 comprises a coordinate rotation digital computer (CORDIC) block 120, adder block 121, differential phase shift keying (DPSK) demodulation block 122, timing error detector (TED) block 124, loop filter block 132, and an integrator block 134. The timing control block comprises a loop filter block 126, integrator block 128, and a controller block 130. In an embodiment of the invention, a finite impulse response (FIR) filter block may be utilized as a replacement of the IIR filter block 110.

The anti-aliasing filter block (AAS) 102 may comprise suitable circuitry, logic and/or code that may be adapted to mitigate the effects of aliasing in a generated IF signal that may be the result of downconversion of the received RF signal. The decimator block 104 may comprise suitable logic circuitry and/or code that may be adapted to decimate or remove a portion of the output signal from the AAS 102 that may not be required. In one embodiment of the invention, the decimator block 104 may be adapted to decimate the signal from the AAF 102 from about 48 MHz down to about 12 MHz.

The direct digital frequency synthesizer (DDFS) 106 may comprise suitable circuitry, logic, and/or code that may be adapted to provide fast frequency switching in the receiver 12 of FIG. 1. The direct digital frequency synthesizer 106 may be adapted to provide fast linear phase and/or frequency switching, while providing excellent spectral purity. The low pass filter (LPF) block 108 may comprise suitable circuitry, logic and/or code that may be adapted to low pass filter an output signal generated from the DDFS 106. The infinite impulse response filter block (IIR) 110 may comprise suitable circuitry, logic, and/or code that may be adapted to equalize a received signal. The processed signal generated by the IIR block 110 may comprise a symbol.

The time delay (TDL) block 112 may comprise suitable circuitry, logic, and/or code that may be adapted to apply varying levels of time adjustment to a received symbol from the IIR 110. The amount of time adjustment applied to the received symbol may be based on a received signal from the controller block 130. The time adjustment may represent a time delay or a time advance in a periodic signal. A time delay may increase a time interval between the current symbol and a previously received symbol. A time advance may decrease a time interval between the current symbol and the previously received symbol. The time adjustment may comprise a time phase correction in a received symbol.

The selector 113 may couple the output from the TDL block 112 to an input to the GFSK receiver block 114, or to inputs to the MUX 117 and decimator 116 blocks. The selector 113 may perform output to input coupling based on the portion of the Bluetooth frame currently being received. While receiving the sync word and header portion of the Bluetooth frame, the selector 113 may couple the output from the TDL block 112 to an input to the GFSK receiver block 114. While receiving the sync sequence portion of the Bluetooth frame and during the guard interval, the selector 113 may couple the output of the TDL block 112 to an input to the MUX block 117. While receiving the payload portion of the Bluetooth frame the selector 113 may couple the output of the TDL block 112 to an input to the decimator block 116.

The GFSK receiver block 114 may comprise suitable circuitry, logic, and/or code that may be adapted to handle the processing of 1 Mbps Bluetooth signals and generate an output frequency offset signal. The frequency offset signal may represent an estimate to compensate for frequency drift between the carrier frequency utilized at a transmitter that transmits the RF signal, and the carrier frequency utilized at the receiver 12 (FIG. 1a) that receives the RF signal.

The MUX block 117 may comprise suitable logic circuitry, and/or code that may be adapted to couple one of a plurality of input signals to an output signal. The MUX block 117 may receive input signals from the TDL block 112, and from the decimator block 116. The MUX block 117 may couple one of the input signals to an output that is coupled to the frequency correction block 118.

The decimator block 116 may comprise suitable logic circuitry and/or code that may be adapted to decimate at least a portion of the output signal generated by the TDL 114. The decimator block 116 may digitally sample a received signal from the TDL 114 at an instant in time based on a periodic sampling control signal received from the synchronization correlator block 136. In one embodiment of the invention, the decimator block 104 may be adapted to decimate the sampling rate of a signal from 12 MHz down to 2 MHz.

The frequency correction block 118 may comprise suitable circuitry, logic, and/or code that may be adapted to correct a frequency of an input signal received from the MUX block 117. The frequency correction applied to the input signal received from the MUX block 117 may be based on a frequency offset input signal received from the GFSK receiver block 114.

The synchronization correlator block 136 may comprise suitable circuitry, logic and/or code that may be adapted to generate a signal that controls timing of a digital sampling process. The synchronization correlator block 136 may receive a signal from the frequency correction block 118. The synchronization correlator block 136 may utilize the received signal to generate a periodic sampling control signal whose timing is time phase adjusted based on the received signal from the frequency correlation block 118.

The demodulation block 140 may comprise suitable circuitry, logic, and/or code that may be adapted to process a signal comprising a symbol, and extract bits of binary information. The demodulation block 140 may also generate a timing error signal that may be utilized for a time phase correction applied to a subsequently received symbol.

The CORDIC block 120 may comprise suitable circuitry, logic, and/or code that may be adapted to generate, for example, phase and/or angle information. The CORDIC block 120 may receive an input signal comprising a symbol. The symbol may be represented as an in-phase (I) signal and a quadrature (Q) signal, or IQ signal. The CORDIC may process the IQ signal to generate a magnitude signal and a corresponding phase signal. The CORDIC may also process the IQ signal to generate a rotated I signal, $I_R$, and a rotated Q signal, $Q_R$, or $I_R Q_R$ signal.

The adder block 121 may comprise suitable circuitry, logic, and/or code that may be adapted to generate a signal based on a summation of binary information contained in a signal received from the CORDIC block 120, and in a signal received from the integrator block 134. A signal generated by the adder block 121 may comprise a digital representation of angle information.

The DPSK demodulation block 122 may comprise suitable circuitry, logic, and/or code that may be adapted to process received angle information. A signal generated by the DPSK demodulation block 122 may comprise a digital representation of phase information. A signal generated by the DPSK demodulation block 122 may comprise binary bits of information extracted from a received symbol.

The loop filter block 132 may comprise suitable circuitry, logic and/or code that may be adapted to perform a filtering function on binary information contained in a received signal. The loop filter block 132 may generate a weighted average summation based on currently received binary information, and on previously received binary information.

The integrator block 134 may comprise suitable circuitry, logic and/or code that may be adapted to provide an integration function that integrates an output generated from the loop filter block 132. The integrator block 134 may perform the integration function on binary information contained in a received signal. The integrator block 134 may generate a summation based on currently received binary information, and on previously received binary information.

The timing error detector (TED) block 124 may comprise suitable circuitry, logic, and/or code that may be adapted to generate a timing error signal based on received input signals. The TED block 124 may process input signals that comprise magnitude information, and IQ signals. The timing control block 142 may comprise suitable circuitry, logic, and/or code that may be adapted to process a timing error signal, and generate a time phase correction signal.

The loop filter block 126 may comprise suitable circuitry, logic and/or code that may be adapted to perform a filtering function on binary information contained in a received signal. The loop filter block 126 may generate a weighted average summation based on currently received binary information, and on previously received binary information.

The integrator block 128 may comprise suitable circuitry, logic and/or code that may be adapted to provide an integration function that integrates an output generated from the loop filter block 126. The integrator block 128 may perform the integration function on binary information contained in a received signal. The integrator block 128 may generate a summation based on currently received binary information, and on previously received binary information.

The controller block 130 may comprise suitable circuitry, logic and/or code that may be adapted to provide an integration function that integrates an output generated from the integrator block 128. The controller block 130 may perform the integration function on binary information contained in a received signal. The controller block 130 may generate a summation based on currently received binary information, and on previously received binary information. The controller block 130 may compare the generated summation to a threshold value. The controller block 130 may generate a time phase correction signal based on the comparison between the generated summation and the threshold value.

In operation, the AAF block 102 may receive an IF signal containing the beginning of a Bluetooth frame. The IF signal may represent a digital signal comprising a plurality of samples at distinct time instants. The digital IF signal may be characterized by a frequency that corresponds to a sample rate, where the sample rate represents a number of samples that may be contained in the IF signal over a specified period of time. In an embodiment of the invention, the frequency of the IF signal may be approximately 48 MHz.

The AAF block 102 may process the received IF signal to remove aliasing and generate a signal that is communicated to the decimator block 104. The decimator block 104 may reduce the frequency of the IF signal by reducing the number of samples that may be contained in the IF signal over a specified period of time. In an embodiment of the invention, the decimator may reduce the frequency of the IF signal from approximately 48 MHz to approximately 12 MHz.

The DDFS block 106 may generate a frequency carrier signal that may be utilized to demodulate the received IF signal to baseband. The demodulated IF signal may comprise a plurality of symbols, where each symbol may comprise bits of binary information. Each symbol may be represented as an in-phase (I) component signal, and a quadrature (Q) component signal. Collectively, the I signal and the Q signal may represent an IQ signal. The DDFS block 106 may communicate the IQ signal to the LPF block 108.

The LPF block 108 may perform low pass filtering on the IQ signal received from the DDFS block 106 to remove undesired frequency components from the signal. The low pass filtered IQ signal may be communicated by the LPF block 108 to the IIR block 110. The IIR block 110 may equalize the IQ signal received from the LPF block 108 to improve the signal quality of the IQ signal. The IIR block may communicate the equalized IQ signal to the TDL block 112.

The TDL block 112 may receive the IQ signal at an instant in time. If a time correction signal received from the controller block 130, instructs the TDL block 112 to retard output of the IQ signal, the TDL block 112 may delay communicating the IQ signal to the selector 113 until a later point in time. The retarding of output of the received IQ signal may increase the time interval between the output of the current IQ signal and the output of a preceding IQ signal that may have been previously communicated to the selector 113 from the TDL block 112.

If a time correction signal received from the controller block 130, instructs the TDL block 112 to advance output of the IQ signal, the TDL block 112 may advance communicating the IQ signal to the selector 113 to an earlier point in time. The advance of output of the received IQ signal may decrease the time interval between the output of the current IQ signal and the output of a preceding IQ signal that may have been previously communicated to the selector 113 from the TDL block 112.

If a time correction signal received from the controller block 130, instructs the TDL block 112 to make no time adjustment in the output of the IQ signal, the TDL block 112 may not attempt to alter a point in time for communicating the IQ signal to the selector 113. While receiving the sync word, header, guard interval, and sync word portions at the beginning of the received Bluetooth frame, the controller block 130 may instruct the TDL block 112 to make no time adjustment in communicating the IQ signal to the selector 113. While receiving the data payload portion of the Bluetooth frame, the controller block 130 may generate a time adjustment signal that may be utilized by the TDL block 112 to generate a time phase corrected IQ signal.

While processing the sync word and header portions of the received Bluetooth frame, the selector 113 may couple the IQ signal communicated by the TDL block 112 to the GFSK receiver 114. The GFSK receiver 114 may process the received IQ signal to generate a frequency offset estimate. At the end of reception of the header portion of the received Bluetooth frame, the GFSK receiver 114 may communicate a frequency offset estimate to the frequency correction block 118.

During the guard interval and during reception of the sync sequence portion of the received Bluetooth frame, the selector 113 may couple the IQ signal communicated by the TDL block 112 to MUX block 117. The MUX block 117 may couple the IQ signal to the frequency correction block 118. The frequency correction block 118 may utilize the frequency offset estimate generated by the GFSK receiver 114 to process the received IQ signal during the guard interval and sync sequence portion of the received Bluetooth frame. The frequency correction block 118 may subsequently generate a signal that is communicated to the synchronization correlator block 136. The synchronization correlator block 136 may utilize the received signal from the frequency correction block 118 to generate a periodic sampling control signal whose timing is time phase adjusted based on the signal received from the frequency correction block 118.

During reception of the data payload portion of the received Bluetooth frame, where a data rate of the received data payload may exceed 1 Mbps, the selector 113 may couple the IQ signal communicated by the TDL block 112 to the decimator block 116. The decimator block 116 may digitally sample the IQ signal at an instant in time based on the periodic sampling control signal received from the synchronization correlator block 136. The decimator block 116 may reduce the frequency of the IQ signal by reducing the number of samples that may be contained in the baseband signal over a specified period of time. In an embodiment of the invention, the decimator may reduce the frequency of the baseband signal from approximately 12 MHz to approximately 2 MHz.

During reception of the data payload portion of the received Bluetooth frame, where the data payload portion may be coded utilizing DQPSK, or D8PSK modulation types, the MUX block 117 may communicate the IQ signal, received from the decimator block 116, to the frequency correction block 118. The frequency correction block 118 may apply a frequency correction to adjust the frequency of the received IQ signal based on the frequency offset signal generated by the GFSK receiver block 114 during reception of the preceding sync word and header portions of the currently received Bluetooth frame.

During reception of the data payload portion of the received Bluetooth frame, where the data payload portion may be coded utilizing DQPSK, or D8PSK modulation types, the CORDIC block 120 may receive a frequency corrected IQ signal from the frequency correction block 118. The frequency corrected IQ signal may comprise a symbol. For every two symbols received by the CORDIC block 120, a signal may be generated for a first received IQ signal, IQ1, comprising a first symbol, and a signal may be generated for a second received IQ signal, IQ2, comprising a second symbol. The CORDIC block 120 may process the IQ1 signal from a rectangular representation of the first symbol comprising I and Q signals, to a polar representation comprising magnitude, mag1, and angle, ang1, signals. The CORDIC block 120 may process the IQ2 signal to generate a rotated IQ2 signal, where the rectangular representation of the rotated I signal may represent a vector that is rotated compared to the frequency corrected I signal received from the frequency correction block 118. The rectangular representation of the rotated Q signal may represent a vector that is rotated compared to the frequency corrected Q signal received from the frequency correction block 118.

The adder block 121 may receive an angle ang1 signal from the CORDIC block 120. The adder block 121 may also receive a phase rotation signal from the integrator block 134. The adder block 121 may generate an angle signal based on a summation of binary information contained in the signals received from the CORDIC block 120, and the integrator block 134.

The DPSK demodulation block 122 may receive an angle signal from the adder block 121. The DPSK demodulation block 122 may utilize the received angle signal to extract bits of binary information from a received symbol. The extracted bits may comprise demodulated bits of binary information contained in a signal that was encoded and transmitted by a transmitter via an RF channel, and received and decoded by a receiver 12 (FIG. 1a). The DPSK demodulation block 122 may generate a phase signal and a phase error signal based on the received angle signal. The phase signal may comprise a numerical value that corresponds to a range of numerical values represented in the received angle signal. The phase error signal may comprise a numerical value based on the amount by which the numerical value of the phase differs from the numerical value contained in the received angle signal.

The loop filter block 132 may generate a weighted average of numerical values from a plurality of phase error signals received from the DPSK demodulation block 122. The integrator block 134 may generate a numerical summation of numerical values from a plurality of signals generated by the loop filter block 132. The generated numerical summation may be contained in a phase rotation signal generated by the integrator block 134.

The TED block 124 may receive a magnitude mag1 signal and an IQ2 signal from the CORDIC block 120. Based on the received signals from the CORDIC block 120, the TED block 124 may generate a timing error signal. The timing error signal may comprise a numerical value that is based on modulation errors in a plurality of digital samples of IQ signals received over a range of time instants detected at the receiver 12.

The loop filter block 126 may generate a weighted average of numerical values from a plurality of timing error signals received from the TED block 124. The integrator block 128 may generate a numerical summation of numerical values from a plurality of signals generated by the loop filter block 126. The controller block 130 may generate a numerical summation of numerical values from a plurality of signals generated by the integrator block 128. The controller block 130 may compare the generated numerical summation to a numerical threshold value. Based on the comparison between the generated numerical summation and the numerical threshold value, the controller block 130 may communicate a time correction signal that instructs the TDL block 112 to advance in time, or retard in time, the communication of a received IQ signal from the IIR block 110, to the selector 113.

Figure 2A:
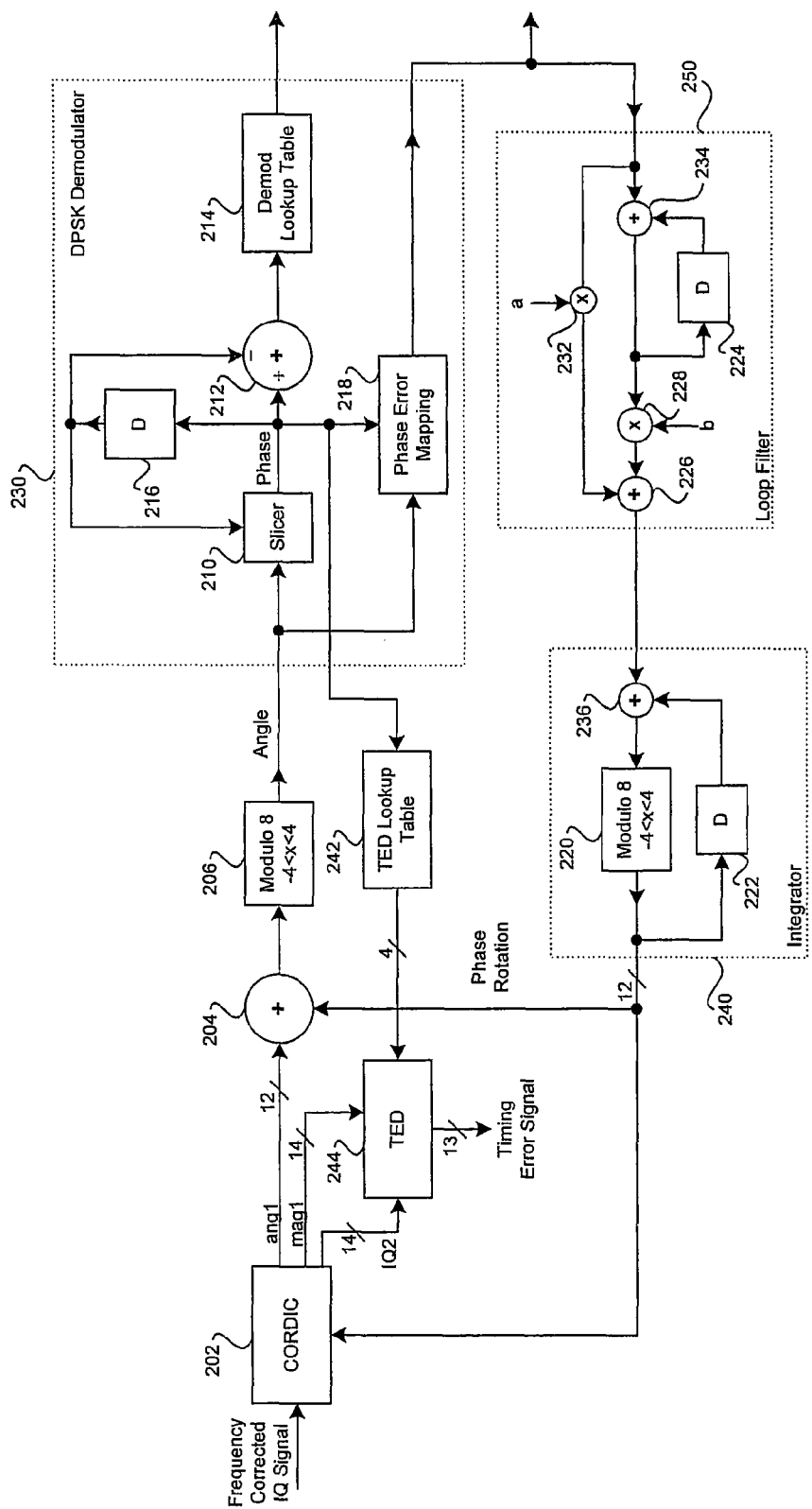
FIG. 2a is an exemplary block diagram of the demodulation block of FIG. 1b in which signal quality measurement based on a mean phase error magnitude of a signal may be utilized, in accordance with an embodiment of the invention.

FIG. 2a is an exemplary block diagram of the demodulation block of FIG. 1b in which signal quality measurement based on mean phase error magnitude of a signal may be utilized, in accordance with an embodiment of the invention. Referring to FIG. 2a, there is shown a CORDIC block 202, a timing error detector (TED) block 244, an adder block 204, modulo counter block 206, TED lookup table block 242, differential phase shift keying (DPSK) demodulator block 230, integrator block 240, and loop filter block 250. The DPSK demodulator block 230 may comprise a slicer block 210, adder block 212, demodulation lookup table block 214, delay block (D) 216, and phase error mapping block 218. The loop filter block 250 may comprise multiplier blocks 228, and 232, adder blocks 226, and 234, and delay block (D) 224. The integrator block 240 may comprise a modulo counter block 220, a delay block 222, and an adder block 236.

The coordinate rotation digital computer (CORDIC) block 202 may receive a plurality of frequency corrected IQ signals. The CORDIC block 202 may process a first received IQ signal to generate a magnitude, mag1, and an angle, ang1. The magnitude mag1 may represent the magnitude of a vector defined by the individual signals I and Q for the first received IQ signal. The angle ang1 may represent the arctangent of the ratio of the individual signals I and Q for the first received IQ signal. The CORDIC block 202 may process a second received IQ signal to generate an IQ2 signal. The IQ2 signal may represent a vector that is a rotated version of the vector defined by the second received IQ signal. The amount by which the IQ2 signal is rotated relative to the second received IQ signal may be determined based on a phase rotation signal received by the CORDIC block 202 from the integrator block 240. Each of the magnitude mag1, the angle ang1, and the IQ2 signal may comprise a plurality of bits of binary information. In one embodiment of the invention, the magnitude mag1 may comprise 14 bits, the angle ang1 may comprise 12 bits, and the IQ2 signal may comprise 14 bits. A plurality of bits of binary information may form a binary representation of a number that comprises an integer part and a fractional part. The adder block 204 may generate a signal based on a summation of binary information contained in an ang1 signal from the CORDIC block 202, and in a phase rotation signal from the integrator block 240.

The modulo counter block 206 may generate a signal based on binary information contained in a received signal from the adder block 204. The modulo counter block 206 may process binary information contained in a received signal to generate processed binary information whose numerical value is less than an upper bound value and greater than a lower bound value. The output signal from the modulo counter block 206 based on the processed binary information may comprise angle information. In an embodiment of the invention the modulo counter block 206 may implement a modulo 8 counter with an upper bound value of 4 and a lower bound value of −4. The modulo counter block 206 may process binary information contained in a received signal to generate processed binary information whose value is greater than −4 and less than 4.

The DPSK demodulator block 230 may implement DPSK demodulation, based on received angle information comprising binary bits of information, to extract bits of binary information contained in a received symbol. The DPSK demodulator block 230 may generate an associated phase error signal. The slicer block 210 may process binary information, contained in angle information received from the modulo counter block 206, to generate a phase signal. The phase signal generated by the slicer block 210 from the received angle information may be based on binary information contained in reference phase information received from the delay block 216. The following code illustrates exemplary generation of phase by the slicer block 210 based on an angle, and a reference phase, ref_phase, for the modulation type DQPSK:

```
if (ref_phase%2==0) {
    if ((angle>=0.5) && (angle<=2.5))
        phase = 1;
    else if ((angle<0.5) && (angle>=−1.5))
        phase = 7;
    else if ((angle<−1.5) && (angle>=−3.5))
        phase = 5;
```

-continued

```
        else
            phase = 3;
    }
    else {
        if ((angle<=3.5) && (angle>=1.5))
            phase = 2;
        else if ((angle<1.5) && (angle>=-0.5))
            phase = 0;
        else if ((angle<-0.5) && (angle>=-2.5))
            phase = 6;
        else
            phase = 4;
    }
```

The following code illustrates generation of phase by the slicer block 210 based on an angle, and a reference phase, ref_phase, for the modulation type D8PSK:

```
if (angle>=0)
    phase = (int) angle;
else
    phase = 7 + (int) angle;
if (angle==-4)
    phase = 4;
```

The delay block 216 may process a received signal by generating an equivalent output signal at a later instant in time. The amount of time that transpires between when the received signal is received by the delay block 216, and when the equivalent output signal is generated by the delay block 216, may represent a time delay. The time delayed output signal from the delay block 216 may represent reference phase information. In an embodiment of the invention the time delay applied by the delay block 216 may be about 1 microsecond.

The adder block 212 may generate a signal based on a summation of binary information contained in a received phase signal from the slicer block 210, and in a reference phase signal received from the delay block 216. The adder block 212 may process binary information contained in the reference phase signal to generate a binary representation whose numerical value is the negative of the numerical value of the binary representation of the reference phase signal. As a result of the negation of the reference phase signal, the adder block 212 may generate a phase change signal that comprises a difference between the phase signal and the reference phase signal.

The demodulation lookup table block 214 may process binary information, contained in a received phase change signal from the adder block 212, to generate demodulated bits. Table 1 presents an exemplary relationship that illustrates the generation of demodulation bits. In Table 1, the heading demod bit may represent the numerical value of the demodulation bits, by the demodulation lookup table block 214 based on a phase change for the modulation type DQPSK:

TABLE 1

| Phase Change | Demod Bit |
|---|---|
| 1 | 0 |
| 3 | 2 |
| 5 | 3 |
| 7 | 1 |

Table 2 presents an exemplary relationship that illustrates the generation of demodulation bits. The heading, demod bit, may represent the numerical value of the demodulation bits, by the demodulation lookup table block 214 based on a phase change for the modulation type D8PSK:

TABLE 2

| Phase Change | Demod Bit |
|---|---|
| 0 | 0 |
| 1 | 4 |
| 2 | 6 |
| 3 | 2 |
| 4 | 3 |
| 5 | 7 |
| 6 | 5 |
| 7 | 1 |

The phase error mapping block 218 may compare binary information contained in a received signal comprising angle information, from the modulo counter block 206, with binary information contained in a received phase signal, from the slicer block 210. The phase error mapping block 218 may generate a phase error signal based on the comparison.

The following code illustrates the generation of a phase error, phase_error, by the phase error mapping block 214 based on an angle, and a phase for the modulation type DQPSK:

```
phase_error = (phase>=4) ? (phase-7.5) - angle : (phase+0.5) - angle;
if (phase_error > 1)
    phase_error -= 8;
if (phase_error < -1)
    phase_error += 8;
```

The following expression presents an exemplary relationship that illustrates the generation of a phase error, phase_error, by the phase error mapping block 214 based on an angle, and a phase for the modulation type D8PSK:

phase_error=(phase>=4)?(phase−7.5)−angle:(phase+0.5)−angle;

The loop filter block 250 may implement a filtering function to process a received phase error signal from the phase error mapping block 218. The loop filter block 250 may generate a signal that represents a weighted average of the numerical values of binary information contained in a plurality of received phase error signals. The numerical values of binary information in generated signal from the loop filter block 250 may exhibit less variation when observed over a range of time instants in comparison to the numerical values of binary information contained in a plurality of received phase error signals observed over approximately the same range of time instants. The adder block 234 may generate a signal based on a summation of binary information contained in a received phase error signal, from the phase error mapping block 218, and in a signal received from the delay block 224.

The delay block 224 may process a received signal by generating an equivalent output signal at a later instant in time. The amount of time that transpires between when the received signal is received by the delay block 224, and when the equivalent output signal is generated by the delay block 224, may represent a time delay. In an embodiment of the invention the time delay applied by the delay block 224 may be about 1 microsecond.

The multiplier block 228 may generate a signal based on a multiplicative scaling of binary information contained in a received signal, from the adder block 234. The multiplier block 228 may multiply the numerical value of binary information contained in the received signal by a scale factor whose numerical value is approximately equal to a number represented by the variable b.

The multiplier block 232 may generate a signal based on a multiplicative scaling of binary information contained in a received phase error signal, from the phase error mapping block 218. The multiplier block 232 may multiply the numerical value of binary information contained in the received phase error signal by a scale factor whose numerical value is approximately equal to a number represented by the variable a. The adder block 226 may generate a signal based on a summation of binary information contained in a received signal, from the multiplier block 228, and in a signal received from the multiplier block 232.

The integrator block 240 may implement an integration function to process a received signal from the loop filter block 250. The integrator block 240 may generate a signal that represents a summation of the numerical values of binary information contained in a plurality of received signals from the loop filter block 250. The adder block 236 may generate a signal based on a summation of binary information contained in a received signal, from the loop filter block 250, and in a signal received from the delay block 222.

The delay block 222 may process a received signal by generating an equivalent output signal at a later instant in time. The amount of time that transpires between when the received signal is received by the delay block 222, and when the equivalent output signal is generated by the delay block 222, may represent a time delay. In an embodiment of the invention the time delay applied by the delay block 222 may be equal to about 1 microsecond.

The modulo counter block 220 may generate a signal based on binary information contained in a received signal from the adder block 236. The modulo counter block 220 may process binary information contained in a received signal to generate processed binary information whose numerical value is less than an upper bound value and greater than a lower bound value. The output signal from the modulo counter block 220 based on the processed binary information may comprise phase rotation information. In an embodiment of the invention, the modulo counter block 220 may implement a modulo 8 counter with an upper bound value of 4 and a lower bound value of −4. The modulo counter block 220 may process binary information contained in a received signal to generate processed binary information whose value is greater than −4 and less than 4.

The timing error detector (TED) lookup table block 242 may process binary information contained in a received signal comprising phase information, from the modulo counter block 206. The timing error detector block 242 may generate an IQ signal based on the received phase information. In an embodiment of the invention the IQ signal generated by the TED lookup table block 242 may comprise 4 bits of binary information. A plurality of bits of binary information may form a binary representation of a number that comprises an integer part and a fractional part. Table 3 presents an exemplary relationship that illustrates the generation of an IQ signal, where the IQ signal may be represented by the expression, I+jQ, by the TED lookup table block 242 based on a phase:

TABLE 3

| Phase | IQ |
|---|---|
| 0 | 0.92387953 + j 0.3268343 |
| 1 | 0.3268343 + j 0.92387953 |
| 2 | −0.3268343 + j 0.92387953 |
| 3 | −0.92387953 + j 0.3268343 |
| 4 | −0.92387953 − j 0.3268343 |
| 5 | −0.3268343 − j 0.92387953 |
| 6 | 0.3268343 − j 0.92387953 |
| 7 | 0.92387953 − j 0.3268343 |

The timing error detector block (TED) 244 may process binary information contained in an IQ2 signal, from the CORDIC block 202, binary information contained in a magnitude signal mag1, from the CORDIC block 202, and binary information contained in an IQ signal, from the TED lookup table block 242. The TED block 244 may generate a timing error signal based on the received IQ2, mag1, and IQ signals.

In operation the slicer block 210 may utilize a phase signal generated based on an angle signal received at a preceding time instant from the modulo counter block 206 to generate a phase signal based on an angle signal received at a subsequent time instant from the modulo counter block 206. The adder block 212 may generate a phase change signal based on a numerical difference between a numerical value of a phase signal generated at a preceding time instant by the slicer block 210, and a numerical value of a phase signal generated at a subsequent time instant by the slicer block 210.

Figure 2B:
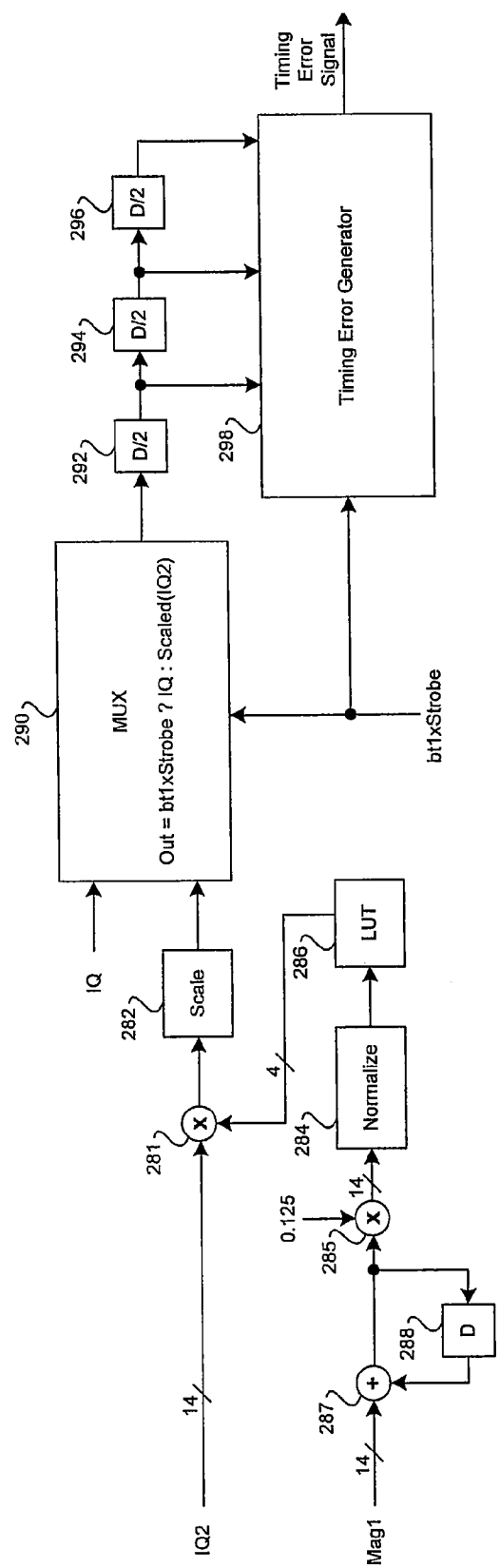
FIG. 2b is an exemplary block diagram of a decision directed time error detector in accordance with an embodiment of the invention.

FIG. 2b is an exemplary block diagram of a decision directed time error detector in accordance with an embodiment of the invention. Referring to FIG. 2b there is shown a multiplier block 281, scale block 282, normalize block 284, lookup table (LUT) block 286, multiplier block 285, adder block 287, a delay block 288, a multiplexer (MUX) 290, delay blocks 292, 294, and 296, and timing error generator block 298.

The multiplier block 281 may generate a signal based on a multiplicative scaling of binary information contained in a received IQ2 signal, from the CORDIC block 202. The multiplier block 281 may multiply the numerical value of binary information contained in the received IQ2 signal by a scale factor whose numerical value is approximately equal to the numerical value of binary information contained in a received signal from the LUT block 286. The adder block 287 may generate a signal based on a summation of binary information contained in a received magnitude signal mag1, from the CORDIC block 202, and in a signal received from the delay block 288.

The delay block 288 may process a received signal by generating an equivalent output signal at a later instant in time. The amount of time that transpires between when the received signal is received by the delay block 288, and when the equivalent output signal is generated by the delay block 288, may represent a time delay. In an embodiment of the invention the time delay applied by the delay block 288 may be about 1 microsecond.

The multiplier block 285 may generate a signal based on a multiplicative scaling of binary information contained in a received signal from the adder block 287. The multiplier block 285 may multiply the numerical value of binary information contained in the received signal by a scale factor whose numerical value is approximately equal to about 0.125. In an embodiment of the invention the signal generated by the multiplier block 285 may comprise 14 bits of binary information. A plurality of bits of binary information may form a binary representation of a number that comprises an integer part and a fractional part. The normalize block 284 may generate a signal based on a normalization of binary information contained in a received signal from the multiplier block 285. The normalize block 284 may process binary information contained in a received signal to generate an index signal. The following code illustrates the normalization of a received signal, x, by the normalize block 284:

```
n=0;
if (x >= 1) {
    while (x >= 1) {
        n -= 1;
        x /= 2;
    }
}
else {
    while (x < 0.5) {
        n += 1;
        x *= 2;
    }
}
``` where the variable, n, may represent normalization counter. The value of the received signal x after processing by the normalize block, may be utilized to generate a numerical value corresponding to the index signal, k:

$$k=(int)(2*LUTsize*(x-0.5)) \qquad \text{equation}[1]$$

where the variable LUTsize may represent the number of entries contained in a lookup table.

The LUT block 286 may generate a signal based on a received index signal from the normalize block 284. The LUT may utilize binary information contained in the index signal to select an entry from a lookup table comprising a plurality of entries. The LUT block 286 may generate a signal containing binary information whose numerical value is approximately equal to that of the selected entry from the lookup table. An exemplary lookup table that may be utilized by the LUT block 286 may be represented as follows:

$$LUT[k]=1/(0.5+0.5*k/LUTsize) \qquad \text{equation}[2]$$

where the index variable, k, represents an index that may be utilized by the LUT block 286 to select an entry from a lookup table comprising a number of entries equal to the numerical value of the variable LUTsize. The range of values for the index variable k may be represented:

$$0<=k<=LUTsize-1 \qquad \text{equation}[3]$$

The scale block 282 may generate a scaled IQ2 signal based on a received signal from the multiplier block 281. The scale block 282 may multiply the numerical value of binary information contained in the received signal by a scale factor whose numerical value is based on an amount or normalizing performed by the normalize block 284. In an embodiment of the invention, the scale factor may be approximately equal to $2^n$ where the value of the normalization counter n may be determined based on processing performed by the normalize block 284 as illustrated in Table 8.

The MUX block 290 may couple one of a plurality of input signals to an output signal based on a timing signal. The MUX block 290 may receive input signals comprising an IQ signal from the TED lookup table 242, and a scaled IQ2 signal from the scale block 282. The MUX block 290 may utilize a Bluetooth 1× strobe, bt1×Strobe timing signal, generated by the synchronization correlator block 136, to select one input signal from the plurality of input signals to be utilized in generating an output signal. The bt1×Strobe timing signal may represent a periodic signal. In an embodiment of the invention, the bt1×Strobe timing signal may comprise an alternating binary asserted LOW followed by binary asserted HIGH sample sequence, wherein the time interval for each component in the sample sequence may be approximately 500 nanoseconds. In an embodiment of the invention, the MUX 290 may generate an output signal based on the received IQ signal when the current sample in the bt1×Strobe timing signal is asserted binary HIGH. The MUX 290 may generate an output signal based on the received scaled IQ2 signal when the current sample in the bt1×Strobe timing signal is asserted binary LOW.

The delay blocks 292, 294, and 296 may process a received signal by generating an equivalent output signal at a later instant in time. The amount of time that transpires between when the received signal is received by the delay block 292, 294, or 296 and when the equivalent output signal is generated by the delay block 292, 294, or 296 may represent a time delay. In an embodiment of the invention the time delay applied by the delay block 292, 294, or 296 may be about 500 nanoseconds.

The timing error generator block 298 may process received signals from the delay blocks 292, 294, and 296 to generate a timing error signal. Signals may be received at the timing error generator block based on the bt1×Strobe timing signal, generated by the synchronization correlator block 136.

In operation the magnitude mag1 signal received from the CORDIC block 202 may be utilized generate a scaled version of the IQ2 signal received from the CORDIC block 202. The scaled IQ2 signal generated by the scale block 282 may comprise a vector representation whose magnitude is approximately equal to the magnitude of the vector representation of the scaled IQ signal received by the MUX block 290 and generated by the TED lookup table block 242. The timing error generator block 298 may generate a timing error signal based on a plurality of time delayed signals generated by the MUX block 290.

The signal generated by the delay block 296 and received by the timing error generator block 298 at a time instant based on the bt1×Strobe timing signal may comprise a signal generated by the MUX block 290 at a preceding time instant. For example, for a signal generated by the MUX block 290 at a time instant identified as time=n, the signal generated by the delay block 296 at time=n may have been generated by the MUX block 290 at time=n-3. The signal generated by the delay block 296 at time=n may be referred to as signal(n-3). The signal, signal(n-3), may represent a complex quantity comprising a real component, re(signal(n-3)), and an imaginary component, im(signal(n-3)).

The signal generated by the delay block 294 and received by the timing error generator block 298 at a time instant based on the bt1×Strobe timing signal may comprise a signal generated by the MUX block 290 at a time instant subsequent to the time instant at which the signal generated by the delay block 296 was generated by the MUX block 290. For example, for a signal generated by the MUX block 290 at a time instant identified as time=n, the signal generated by the delay block 294 at time=n may have been generated by the MUX block 290 at time=n-2. The signal generated by the delay block 294 at time=n may be referred to as signal(n-2). The signal, signal(n-2), may represent a complex quantity comprising a real component, re(signal(n-2)), and an imaginary component, im(signal(n-2)).

The signal generated by the delay block 292 and received by the timing error generator block 298 at a time instant based on the bt1×Strobe timing signal may comprise a signal generated by the MUX block 290 at a time instant subsequent to the time instant at which the signal generated by the delay block 294 was generated by the MUX block 290. For example, for a signal generated by the MUX block 290 at a time instant identified as time=n, the signal generated by the delay block 292 at time=n may have been generated by the MUX block 290 at time=n-1. The signal generated by the delay block 292 at time=n may be referred to as signal(n-1). The signal, signal(n-1), may represent a complex quantity comprising a real component, re(signal(n-1)), and an imaginary component, im(signal(n-1)).

The timing error generator block 298 may generate a timing error signal, $T_{err}$, based on the complex signals signal(n-1), signal(n-2), and signal(n-3):

$$T_{err}=(re(signal(n-3))-re(signal(n-1)))*re(signal(n-2))+(im(signal(n-3))-im(signal(n-1)))*im(signal(n-2))$$ equation[4]

Figure 3:
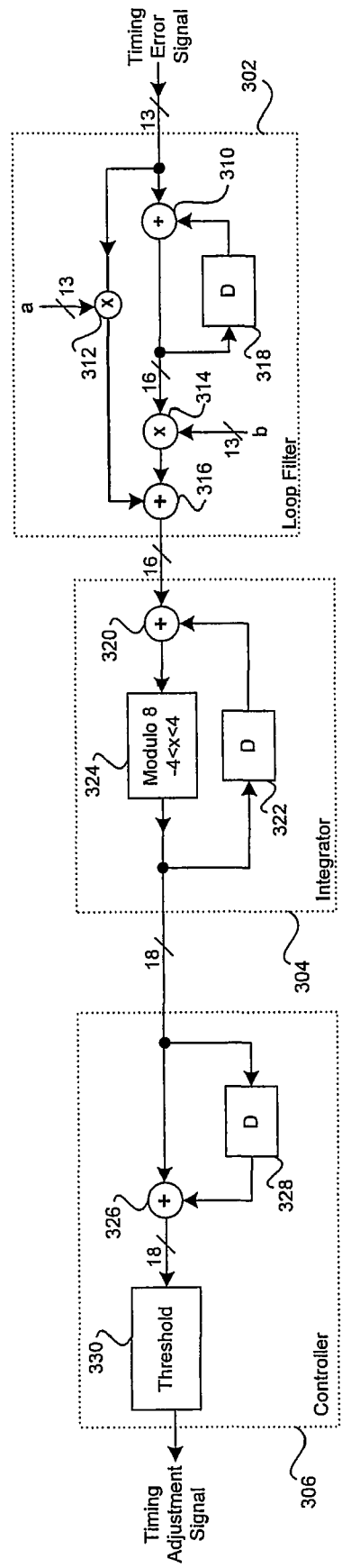
FIG. 3 is an exemplary block diagram of the timing control block in accordance with an embodiment of the invention.

FIG. 3 is an exemplary block diagram of the timing control block in accordance with an embodiment of the invention. Referring to FIG. 3 there is shown a loop filter block 302, integrator 304, and controller 306. The loop filter block 302 may comprise multiplier blocks 312, and 314, adder blocks 310, and 316, and delay block (D) 318. The integrator block 304 may comprise a modulo counter block 324, a delay block 322, and an adder block 320. The controller block 306 may comprise a delay block 328, an adder block 326, and a threshold block 330.

The loop filter block 302 may implement a filtering function to process a received timing error signal from the timing error detector (TED) block 244 (FIG. 2a). The loop filter block 302 may generate a signal that represents a weighted average of the numerical values of binary information contained in a plurality of received phase error signals. The numerical values of binary information in generated signal from the loop filter block 302 may exhibit less variation when observed over a range of time instants in comparison to the numerical values of binary information contained in a plurality of received phase error signals observed over approximately the same range of time instants.

The adder block 310 may generate a signal based on a summation of binary information contained in a received timing error signal, from the TED block 244, and in a signal received from the delay block 318.

The delay block 318 may process a received signal by generating an equivalent output signal at a later instant in time. The amount of time that transpires between when the received signal is received by the delay block 318, and when the equivalent output signal is generated by the delay block 318, may represent a time delay. In an embodiment of the invention, the time delay applied by the delay block 318 may be about 1 microsecond.

The multiplier block 314 may generate a signal based on a multiplicative scaling of binary information contained in a received signal, from the adder block 310. The multiplier block 314 may multiply the numerical value of binary information contained in the received signal by a scale factor whose numerical value is approximately equal to a number represented by the variable b. In an embodiment of the invention, the signal generated by the multiplier block 314 may comprise 13 bits of binary information. A plurality of bits of binary information may form a binary representation of a number that comprises an integer part and a fractional part.

The multiplier block 312 may generate a signal based on a multiplicative scaling of binary information contained in a received timing error signal, from the TED block 244. The multiplier block 312 may multiply the numerical value of binary information contained in the received phase error signal by a scale factor whose numerical value is approximately equal to a number represented by the variable a. In an embodiment of the invention, the signal generated by the multiplier block 312 may comprise 13 bits of binary information. A plurality of bits of binary information may form a binary representation of a number that comprises an integer part and a fractional part. The adder block 316 may generate a signal based on a summation of binary information contained in a received signal, from the multiplier block 314, and in a signal received from the multiplier block 312.

The integrator block 304 may implement an integration function to process a received signal from the loop filter block 302. The integrator block 304 may generate a signal that represents a summation of the numerical values of binary information contained in a plurality of received signals from the loop filter block 302. The adder block 320 may generate a signal based on a summation of binary information contained in a received signal, from the loop filter block 302, and in a signal received from the delay block 322.

The delay block 322 may process a received signal by generating an equivalent output signal at a later instant in time. The amount of time that transpires between when the received signal is received by the delay block 322, and when the equivalent output signal is generated by the delay block 322, may represent a time delay. In an embodiment of the invention, the time delay applied by the delay block 322 may be about 1 microsecond.

The modulo counter block 324 may generate a signal based on binary information contained in a received signal from the adder block 320. The modulo counter block 324 may process binary information contained in a received signal to generate processed binary information whose numerical value is less than an upper bound value and greater than a lower bound value. The output signal from the modulo counter block 324 based on the processed binary information may comprise phase rotation information. In an embodiment of the invention, the modulo counter block 324 may implement a modulo 8 counter with an upper bound value of 4 and a lower bound value of −4. The modulo counter block 324 may process binary information contained in a received signal to generate processed binary information whose value is greater than −4 and less than 4.

The controller block 306 may implement a threshold function to process a received signal from the integrator block 304. The controller block 306 may generate a signal that represents a summation of the numerical values of binary information contained in a plurality of received signals from the integrator block 304. The controller block may compare numerical value resulting from the summation to a threshold value. Based on the comparison the controller block may generate a timing adjustment signal.

The delay block 328 may process a received signal by generating an equivalent output signal at a later instant in time. The amount of time that transpires between when the received signal is received by the delay block 328, and when the equivalent output signal is generated by the delay block 328, may represent a time delay. In an embodiment of the invention, the time delay applied by the delay block 322 may be about 100 microseconds. The adder block 326 may generate a signal based on a summation of binary information contained in a received signal, from the integrator block 304, and in a signal received from the delay block 328. In an embodiment of the invention, the signal generated by the adder block 326 may comprise 18 bits of binary information.

A plurality of bits of binary information may form a binary representation of a number that comprises an integer part and a fractional part.

The threshold block 330 may generate a timing adjustment signal based on a comparison between a numerical threshold value, and the numerical value of binary information contained in a signal received from the adder block 326. Various embodiments of the invention may not be limited to a specific modulation type and may be applicable to a plurality of modulation types. For example, a payload portion of a received Bluetooth frame may utilize differential quaternary phase shift keying (DQPSK), differential 8-level phase shift keying (D8PSK), or other M-level, or M-ary, modulation types.

Figure 4:
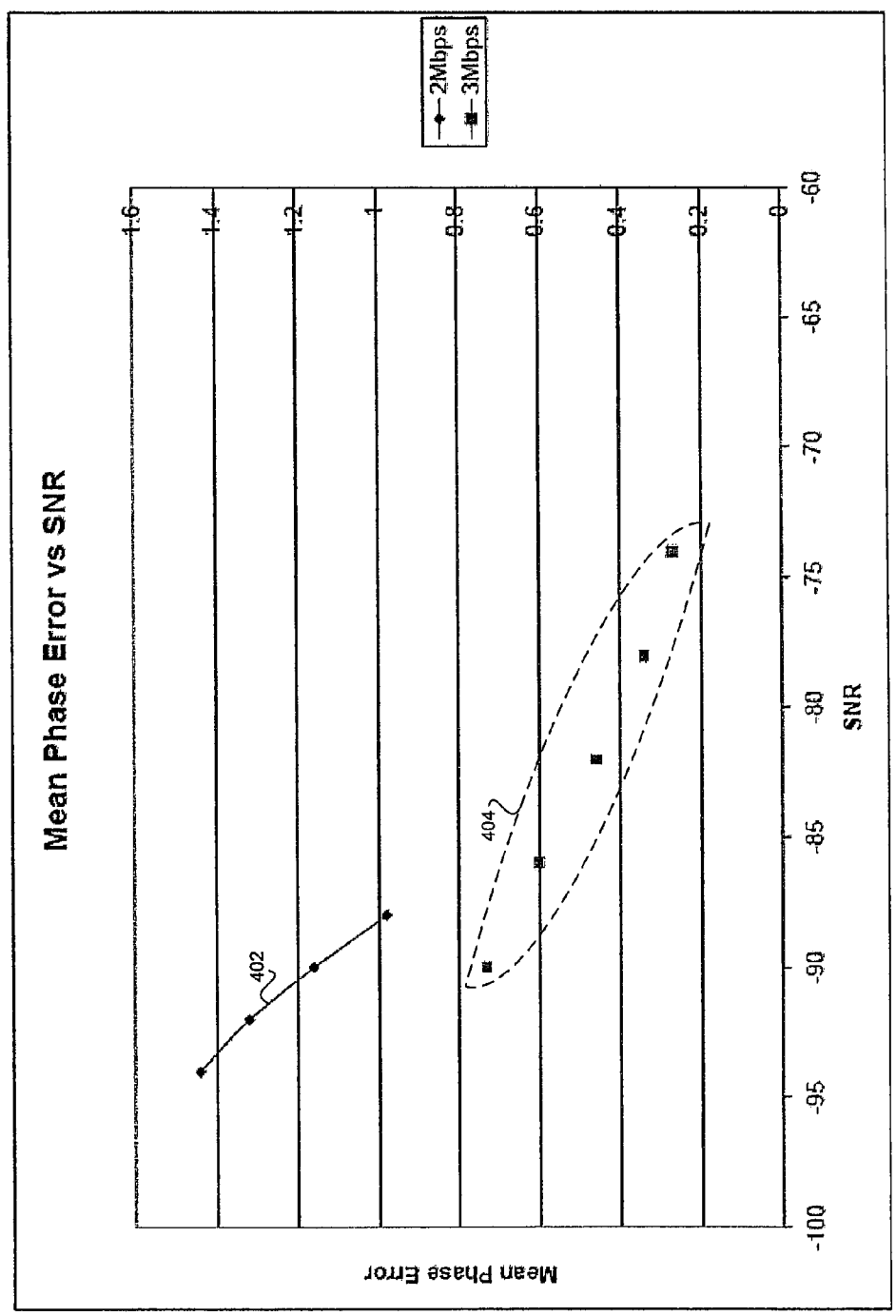
FIG. 4 is a graph illustrating a plot of mean phase error versus signal to noise ration (SNR), in accordance with an embodiment of the invention.

FIG. 4 is a graph illustrating a plot of mean phase error versus signal to noise ration (SNR), in accordance with an embodiment of the invention. Referring to FIG. 4 there is shown plot 402, and plot 404. Plot 402 may represent a plot of mean phase error versus SNR for a data rate of 2 Mbps. The mean phase error may be measured in units of radians. The data rate may represent the data rate for a data payload portion of a received Bluetooth frame. The DQPSK modulation type may be utilized to transmit a data payload portion of a Bluetooth frame at a data rate of 2 Mbps. Plot 404 may represent a plot of mean phase error versus SNR for a data rate of 3 Mbps. The mean phase error may be measured in units of radians. The data rate may represent the data rate for the data payload portion of a received Bluetooth frame. The D8PSK modulation type may be utilized to transmit a data payload portion of a Bluetooth frame at a data rate of 3 Mbps.

In operation, the processor 16 (FIG. 1a) in the Bluetooth receiver 12 may receive the phase error signal generated by the phase error mapping block 218 (FIG. 2a). The processor may utilize binary information contained in the received phase error signal to determine a numerical value for a mean phase error. From the derived mean phase error, the processor 16 may estimate the received signal quality for a received Bluetooth signal. Based on the estimated signal quality, the data rate utilized to transmit the data payload portion of a Bluetooth frame may be selected. A modulation type may be selected based on, for example, the selected data rate. For example, utilizing FIG. 4, if there is a target SNR for a received RF signal of less than −90 dB, the derived phase error may be required to be no greater than approximately 0.7 radians if a subsequently received Bluetooth frame is to utilize D8PSK modulation. However, if a subsequently received Bluetooth frame is to utilize DQPSK modulation the derived mean phase error may be required to be no greater than approximately 1.15 radians.

Figure 5:
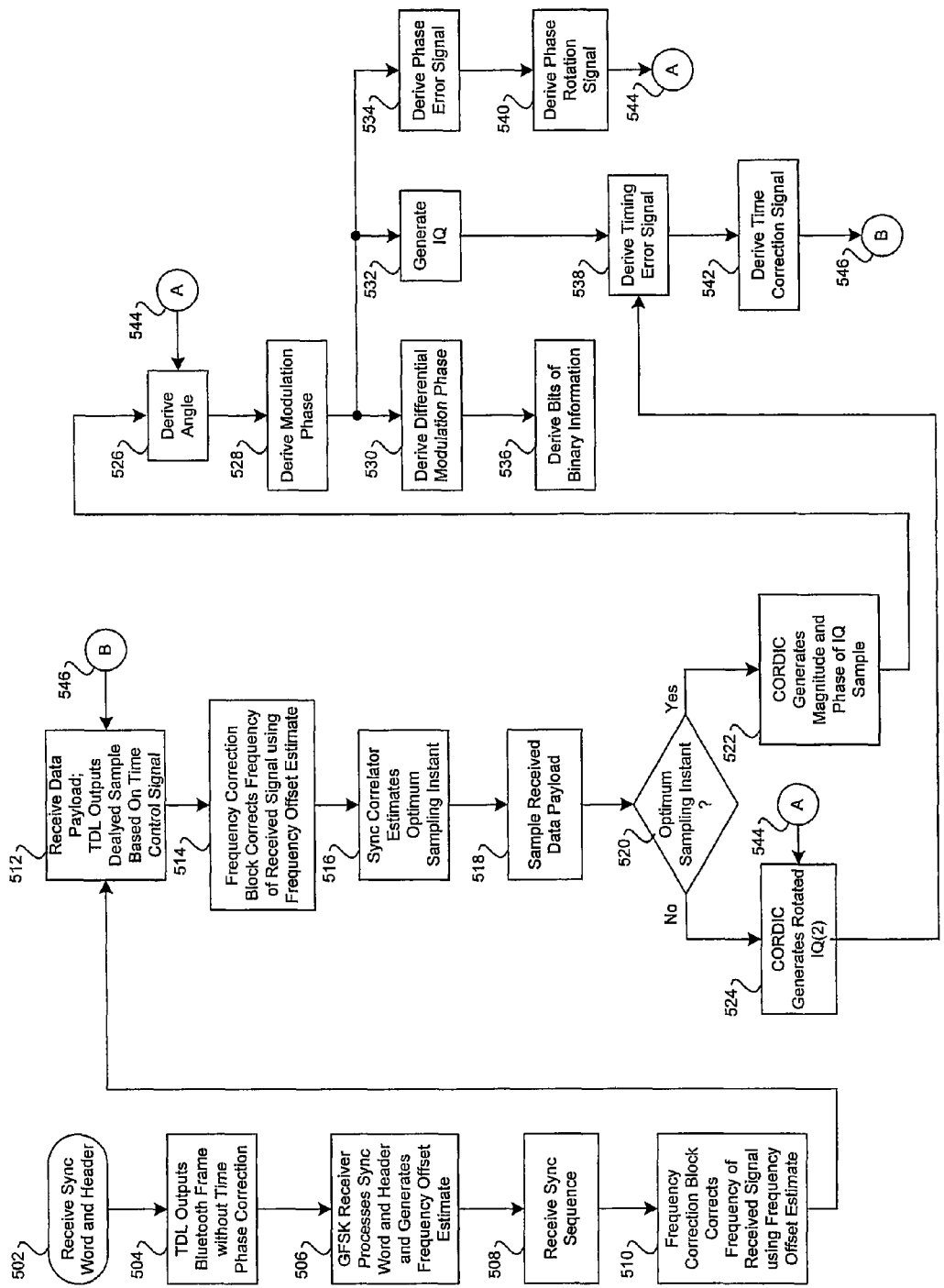
FIG. 5 is a flowchart illustrating exemplary steps for deriving a measure of received signal quality based on a mean square error, in accordance with an embodiment of the invention.

FIG. 5 is a flowchart illustrating exemplary steps for deriving a measure of received signal quality based on mean square error, in accordance with an embodiment of the invention. Referring to FIG. 5, in step 502 a sync word and header portion of a Bluetooth frame may be received by a receiver 12 (FIG. 1a). In step 504, the TDL block 112 (FIG. 1b) may output a sync word and header portion of a received Bluetooth frame without utilizing time phase correction. In step 506, the GFSK receiver 114 may process the sync word and header and generate a frequency offset estimate. In step 508 sync sequence portion of a Bluetooth frame may be received by a receiver 12. In step 510, the frequency correction block 118 may correct the frequency of a received Bluetooth signal based on the generated frequency offset estimate.

In step 512, a data payload portion of a Bluetooth frame may be received by the TDL block 112. The data rate for the received data payload may exceed 1 Mbps. The sample output of the received data payload from the TDL block 112 may be delayed based on a time correction signal from step 546. In step 514 the frequency correction block 118 may correct the frequency of the received Bluetooth signal carrying the data payload based on the generated frequency offset estimate. In step 516, the synchronization correlator block 136 may estimate an optimum sampling instant. In step 518 a received data payload may be sampled by the decimator block 116 at a time instant based on a periodic sampling control signal generated by the synchronization correlator block 136.

Step 520 may determine whether a sample is at an optimum sampling instant. If a sample is not at an optimum sampling instant, in step 524 the CORDIC block 120 may generate a rotated IQ symbol, identified as IQ(2). The CORDIC block 120 may utilize a phase rotation signal from step 544. The IQ(2) symbol may be utilized in step 538 that may follow step 524. If a sample is at an optimum sampling instant, at step 522 the CORDIC 120 may generate magnitude and angle information for the IQ sample.

In step 526, modulo counter block 206 (FIG. 2a) may derive an angle based on an angle from the CORDIC block 202, and a phase rotation signal from step 544. In step 528 the angle from step 526 may be utilized by the slicer block 210 to generate a modulation phase. The modulation phase generated in step 528 may be utilized to generate a plurality of signals. In step 530, the modulation phase may be utilized to derive a differential modulation phase. In step 536, the differential modulation phase derived in step 530 may be utilized by the demodulation lookup table block 214 to derive bits of binary information contained in a symbol.

In step 532, the modulation phase generated in step 528 may be utilized by the TED lookup table block 242 to generate an IQ signal. In step 538, the IQ signal from the TED lookup table block 242, the IQ(2) signal from the CORDIC block 202, and the magnitude from the CORDIC block 202, may be utilized by the TED block 244 to generate a timing error signal. In step 542, the timing control block 142 (FIG. 1b) may utilize the timing error signal, generated in step 538, to derive a time correction signal. Step 546 may represent a reference to the derived time correction signal from step 542.

In step 534, the modulation phase generated in step 528 may be utilized by the phase error mapping block 218 to derive a phase error signal. In step 540, the phase error signal derived in step 534 may be utilized by the loop filter 250, and the integrator 240, to derive a phase rotation signal. Step 544 may represent a reference to the derived phase rotation signal from step 540.

Figure 6:
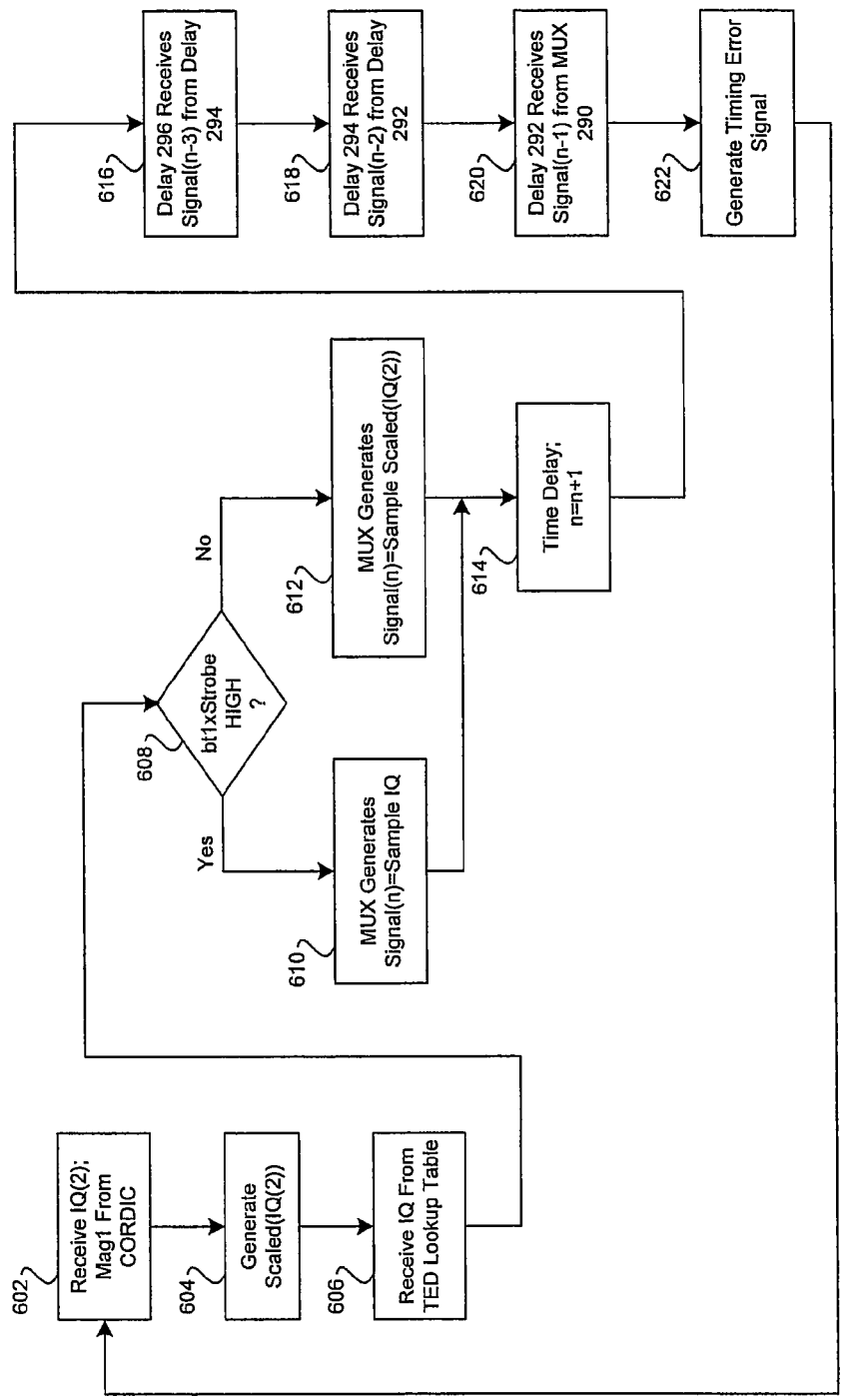
FIG. 6 is a flowchart illustrating exemplary steps for generating a timing error signal, in accordance with an embodiment of the invention.

FIG. 6 is a flowchart illustrating exemplary steps for generating a timing error signal, in accordance with an embodiment of the invention. Referring to FIG. 6, in step 602 an IQ(2) signal, and a magnitude signal mag1 may be received from the CORDIC block 202 (FIG. 2a). In step 604, a scaled (IQ(2)) signal may be generated. In step 606, an IQ signal may be received from the TED lookup table block 242. Step 608 may determine whether the bt1×Strobe signal, from the synchronization correlator block 136 (FIG. 1b), is asserted logic HIGH. If it is, in step 610, the MUX 290 (FIG. 2b) may generate a signal at a time instant time=n, where the generated signal comprises a sample of the IQ signal at the time instant time=n. If the bt1×Strobe signal is not asserted HIGH at step 608, in step 612, the MUX 290 may generate a signal at a time instant time=n, where the generated signal comprises a sample of the scaled (IQ(2)) signal at the time instant time=n. In step 614 the signal sampled in step 610 or 612 may be time delayed. The time instant index, n, may be incremented to indicate a subsequent time instant.

In step 616, delay block 296 may receive a signal from delay block 294. The signal, signal(n-3), may have been generated by the MUX 290 at a time instant previous to the current time instant. In an embodiment of the invention, the signal, signal(n-3), may have been generated by the MUX 290 approximately 3 time units previous to the current time instant. In step 618, delay block 294 may receive a signal from delay block 292. The signal, signal(n-2), may have been generated by the MUX 290 at a time instant previous to the current time instant. In an embodiment of the invention, the signal, signal(n-2), may have been generated by the MUX 290 approximately 2 time units previous to the current time instant. In step 620, delay block 292 may receive a signal from the MUX block 290. The signal, signal(n-1), may have been generated by the MUX 290 at a time instant previous to the current time instant. In an embodiment of the invention, the signal, signal(n-1), may have been generated by the MUX 290 approximately 1 time unit previous to the current time instant. In step 622, the signals signal(n-1), signal(n-2), and signal(n-3) may be utilized by the timing error generator block 298 to generate a timing error signal.

Various embodiments of the invention may comprise a system for processing a radio frequency (RF) signal. Aspects of the system may comprise circuitry that receives a time phase corrected Bluetooth signal via an RF channel. The circuitry may generate a phase error signal based on the received time phase corrected Bluetooth signal, and generate a mean phase error signal based on the generated phase error signal. A signal to noise ratio (SNR) may be derived based on the generated mean phase error signal, and a data rate may be selected based on the derived SNR.

Another aspect of the system may comprise circuitry that receives a Bluetooth signal, comprising a received symbol, and generates a plurality of time delayed samples comprising at least one received symbol, and at least one subsequent received symbol. The circuitry may generate a timing error signal based on at least a portion of the generated plurality of time delayed samples. The generated timing error signal may be compared to a numerical threshold value, with a time correction signal generated based on the comparison.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a radio frequency (RF) signal, the method comprising:

performing by one or more processors and/or circuits in a wireless device:

computing a phase error value based on a signal received via an RF channel;

computing a mean phase error value based on said computed phase error value; and selecting a data rate based on said computed mean phase error value and a target signal to noise ratio for said received signal.

2. The method according to claim 1, comprising selecting a modulation type based on said selected data rate.

3. The method according to claim 1, comprising generating a time phase corrected signal based on said received signal and a generated time phase correction signal.

4. The method according to claim 3, comprising computing said phase error value based on said generated time phase corrected signal.

5. The method according to claim 1, comprising computing said phase error value based on one or both of a computed phase value and a computed angle value.

6. The method according to claim 5, comprising computing said phase value based on said computed angle value and a computed reference phase value.

7. The method according to claim 6, comprising computing said phase value based on a selected modulation type.

8. The method according to claim 6, comprising computing said reference phase value based on at least one previously computed phase value.

9. The method according to claim 6, comprising computing demodulated bits from said received signal based on said computed phase value and said computed reference phase value.

10. The method according to claim 9, comprising:

computing a subsequent reference phase value based on said computed phase value; and computing a subsequent phase value based on said computed subsequent reference phase value and a computed subsequent angle value.

11. The method according to claim 5, comprising computing a phase rotation value based on said computed phase error value.

12. The method according to claim 11, comprising computing said phase rotation value based on a computed weighted average value.

13. The method according to claim 12, comprising computing said computed weighted average value based on said computed phase error value and one or more previously computed phase error values.

14. The method according to claim 13, comprising computing said phase rotation value based on said computed weighted average value and one or more previously computed weighted average values.

15. The method according to claim 11, comprising computing said angle signal based on said computed phase rotation value and a computed signal angle value.

16. The method according to claim 15, comprising computing said signal angle value based on said received signal.

17. The method according to claim 15, comprising computing said angle value based on a summation of said computed phase rotation value and said computed signal angle value.

18. The method according to claim 17, comprising computing said angle value based on a modulus base value for said summation.

19. A system for processing a radio frequency (RF) signal, the system comprising:
   one or more circuits that are operable to compute a phase error value based on a signal received via an RF channel;
   said one or more circuits are operable to compute a mean phase error value based on said computed phase error value; and
   said one or more circuits are operable to select a data rate based on said computed mean phase error value and a target signal to noise ratio for said received signal.

20. The system according to claim 19, wherein said one or more circuits are operable to select a modulation type based on said selected data rate.

21. The system according to claim 19, wherein said one or more circuits are operable to generate a time phase corrected signal based on said received signal and a generated time phase correction signal.

22. The system according to claim 21, wherein said one or more circuits are operable to compute said phase error value based on said generated time phase corrected signal.

23. The system according to claim 19, wherein said one or more circuits are operable to compute said phase error value based on one or both of a computed phase value and a computed angle value.

24. The system according to claim 23, wherein said one or more circuits are operable to compute said phase value based on said computed angle value and a computed reference phase value.

25. The system according to claim 24, wherein said one or more circuits are operable to compute said phase value based on a selected modulation type.

26. The system according to claim 24, wherein said one or more circuits are operable to compute said reference phase value based on at least one previously computed phase value.

27. The system according to claim 24, wherein said one or more circuits are operable to compute demodulated bits from said received signal based on said computed phase value and said computed reference phase value.

28. The system according to claim 27, wherein said one or more circuits are operable to:
   compute a subsequent reference phase value based on said computed phase value; and
   compute a subsequent phase value based on said computed subsequent reference phase value and a computed subsequent angle value.

29. The system according to claim 23, wherein said one or more circuits are operable to compute a phase rotation value based on said computed phase error value.

30. The system according to claim 29, wherein said one or more circuits are operable to compute said phase rotation value based on a computed weighted average value.

31. The system according to claim 30, wherein said one or more circuits are operable to compute said computed weighted average value based on said computed phase error value and one or more previously computed phase error values.

32. The system according to claim 31, wherein said one or more circuits are operable to compute said phase rotation value based on said computed weighted average value and one or more previously computed weighted average values.

33. The system according to claim 29, wherein said one or more circuits are operable to compute said angle signal based on said computed phase rotation value and a computed signal angle value.

34. The system according to claim 33, wherein said one or more circuits are operable to compute said signal angle value based on said received signal.

35. The system according to claim 33, wherein said one or more circuits are operable to compute said angle value based on a summation of said computed phase rotation value and said computed signal angle value.

36. The system according to claim 35, wherein said one or more circuits are operable to compute said angle value based on a modulus base value for said summation.

* * * * *